Sept. 30, 1952 F. D. LOWTHER, SR 2,612,116
PUMP LUBRICATION
Filed Feb. 17, 1949

Franklin D. Lowther, Sr.
INVENTOR.

Patented Sept. 30, 1952

2,612,116

UNITED STATES PATENT OFFICE 2,612,116

PUMP LUBRICATION

Franklin D. Lowther, Sr., Belle, W. Va.

Application February 17, 1949, Serial No. 77,005

1 Claim. (Cl. 103—153)

This invention relates to new and useful improvements and structural refinements in liquid pumps, more specifically, liquid pumps of the reciprocable piston type, and the principal object of the invention is to provide pressure lubrication for the piston or piston rod, and at the same time, to separate the lubricant from the liquid in the pump.

This object is achieved by the provision of a lubricant chamber together with a reciprocable plunger, the plunger being actuated by variation of pressure in the pump cylinder bore and feeding lubricant under pressure to the piston or piston rod.

Another important feature of the invention resides in the provision of packing on the piston head, so that the lubricant delivered to the piston or piston rod is separated from the liquid being pumped.

A further feature of the invention resides in its simplicity of construction and operation, in its durability, and in its possible application to various uses, particularly for pumping chemicals, acids and other corrosive liquids.

Figure 1:
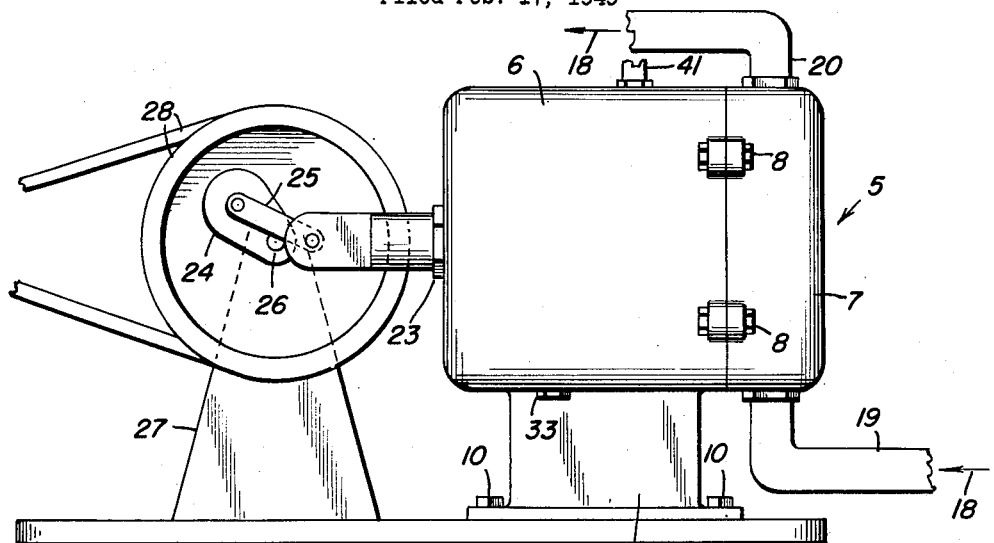
Figure 2:
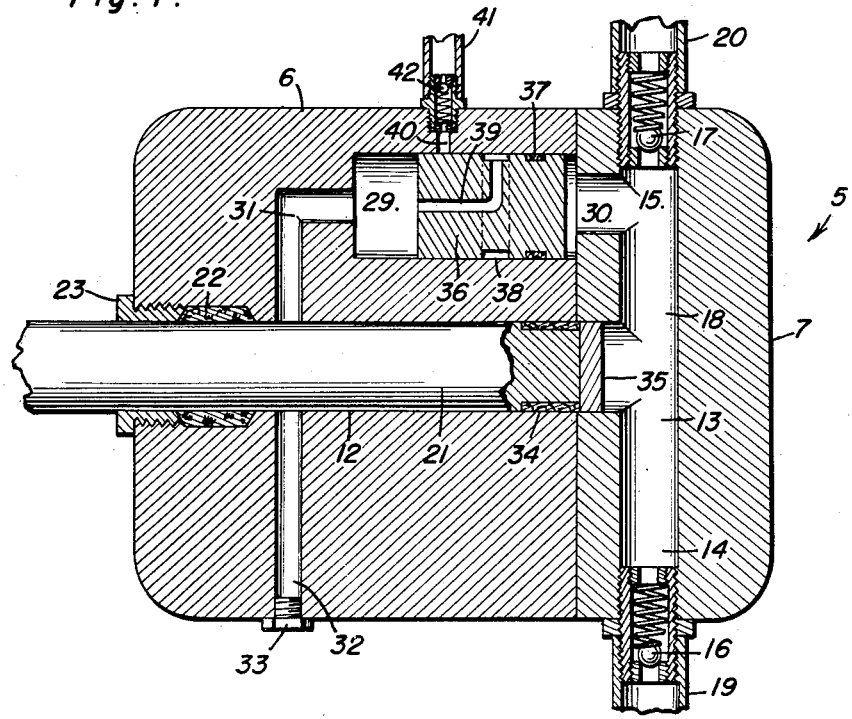

With the above more important objects and features in view and such other objects and features as may become apparent as this specification proceeds, the invention consists essentially of the arrangement and construction of parts as illustrated in the accompanying drawings, in which:

Figure 1 is a side elevational view of the invention including means for reciprocating the pump piston, and Figure 2 is a cross sectional view of the invention per se.

Like characters of reference are used to designate like parts in the specification and throughout the several views.

Referring now to the accompanying drawings in detail, the invention consists of a pump cylinder structure designated generally by the reference character 5, the same including a body or block 6 equipped with a removable head 7 which is attached thereto by means of a plurality of bolts or screws 8.

Needless to say, the block or body 6 may be formed integrally with the head 7, but for purposes of ease of fabrication and maintenance, the two parts are being disclosed as separate components. The body 6 may be supported or mounted in any desired manner, such as for example, upon a base 9 which, in turn, is secured as at 10 to a base plate 11.

The body 6 is formed with a cylinder bore 12 having inner and outer ends, the inner end of the bore 12 extending into the head 7 and communicating with a passage 13. This passage is provided in the head 7 and extends substantially at right angles to the bore 12, as will be clearly apparent.

One end of the passage 13 constitutes an inlet port 14 while its remaining end constitutes an exhaust port 15, both these ports being provided with suitable, spring pressed check valves 16, 17 respectively which permit the flow of liquid through the pump in only one direction, namely that illustrated by the arrow 18.

The check valves 16, 17 are of any conventional type, and fluid delivery and exhaust conduits 19, 20 communicate with the passage 13 for obvious reasons.

A piston 21 is reciprocable in the cylinder bore 12, and the outer end portion of the latter is counter-bored to receive the usual packing 22, retained in position by means of a packing nut 23. The piston 21 projects outwardly from the bore 12 and may be of uniform diameter throughout, or alternatively, may be provided with a suitable piston rod. In any event, the piston or piston rod is reciprocated in the bore 12 in any suitable manner, such as for example, by a cam, an eccentric, or as shown in the accompanying drawing, by a crank 24 and a connecting rod 25. If desired, the crank 24 may be mounted upon a crank shaft 26 journaled in a suitable bracket 27, the latter being supported by the aforementioned base plate 11 and the shaft 26 being rotated by a pulley and belt drive 28. Any other means for reciprocating the piston 21 may, of course, be employed.

The essence of novelty in the invention resides in the provision of a lubricant chamber 29 in the body 6, this chamber communicating with the aforementioned passage 13 through the medium of an opening 30 provided in the head 7 at one end of the lubricant chamber. A lubricant delivery passage 31 is provided at the remaining end of the chamber 29 and is in communication with the cylinder bore 12, as will be clearly apparent. It should be noted that the passage 31 is covered by the piston 21, but sufficient clearance exists between the piston and the bore 12 to facilitate flow of lubricant under pressure into the cylinder bore and around the piston, as will be readily understood. In a similar manner a lubricant drain passage 32 is provided in the body 6 in communication with the bore 12, the outlet of the passage 32 being normally closed by means of a plug 33, the latter being removed when it is periodically desired to replenish the lubricant, or alternatively, the plug 33 being absent when a constant supply of lubricant is provided for the chamber 29 and the lubricant, after performing its function, is either discharged or recirculated.

The inner end portion of the piston 21 is provided with further packing 34, and if the pump is to be used for chemicals, acids or other corrosive liquids, a piston head 35 of non-corrosive material may be secured to the inner end of the piston, substantially as shown.

It is to be noted that the lubricant delivery passage 31 and the discharge passage 32 communicate when the cylinder bore 12 intermediately of the packing 22, 34, that is to say, the lubricant delivered through the passage 31 to the piston 21 is separated by the packing 34 from the liquid which is being pumped through the passage 13.

A reciprocable plunger 36 is provided in the aforementioned lubricant chamber 29, this plunger being equipped with a packing gland 37 and also being provided with an annular groove 38. One end of a lubricant inlet duct 39 communicates with the groove 38, while the remaining end of the duct merges or opens into the chamber 29, as shown.

Lubricant under pressure is forced into the chamber 29 through an inlet port 40 which is registrable with the duct 39 upon reciprocation of the plunger, that is, the port 40 registers with the groove 38 and the duct 39 when the plunger is slid toward the end of the chamber 29 provided with the passage 31.

A lubricant delivery conduit 41 communicates with the port 40 and a check valve 42 is provided so that lubricant may enter but cannot leave the chamber 29 through the port.

Having thus described the construction of the invention, the method of operation thereof will now be presented.

As the piston 21 is reciprocated the inlet and outlet check valves 16, 17 will alternately open and close, so that the liquid which is being pumped will be forced through the passage 13 in an intermittent, pulsating manner as in pumps of conventional design.

With reference to Figure 2, while the piston on its working stroke is moving from left to right, the resultant pressure in the passage 13 will be transmitted through the opening 30 to the plunger 36 and as a result, the plunger will be forced from right to left in the chamber 29. As has been already explained, under such circumstances the port 40 will register with the duct 39 and lubricant under pressure will enter through the bore 40 into the chamber 29 and then through the passage 31 to the piston in the bore 12. Lubrication of the piston will thus be effected.

On the other hand, on the return stroke of the piston the resultant reduced pressure in the passage 13 will draw the plunger 36 from left to right to the position shown, whereby the bore 40 will be closed until the next cycle of operation. It will be apparent from the foregoing that an intermittent, pulsating supply of lubricant to the piston 21 will be effected, and by virtue of the packing 34, the lubricant will be separated from the liquid pumped through the passage 13.

The plunger 36 may be referred to as an equalizing plunger since by virtue thereof an equal amount of pressure will exist in the chamber 29 and the passage 31 as in the chamber 13. In other words, the pressure of the liquid being pumped will be substantially equal to the pressure of the lubricant, so that pressure on both sides of the packing 34 will also be equal. From this it will be apparent that whereas in conventional pumps the packing 22 was employed for retaining the pressure of the pump liquid, the packing 22 in the instant structure merely retains a correspondingly equal pressure of the lubricant.

Finally it should be added that the lubricant is delivered to the chamber 29 through the conduit 41 under pressure of another pump (not shown) which is somewhat higher with respect to the operating pressure in the passage 13 and chamber 29, whereby admission of the lubricant into the chamber 29 is facilitated.

It is believed that the advanatges and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a pump, the combination of a body provided with a cylinder bore having closed and open ends and also provided with inlet and exhaust passages communicating with the closed end of said bore, a piston reciprocable in said bore, outer packing in the open end of the bore in engagement with said piston, inner packing carried by the inner end of the piston, said body being provided with a lubricant chamber and with a pressure transmitting passage connecting one end of said chamber with said exhaust passage, a lubricant delivery duct extending from the other end of said chamber and communicating with said bore at a point between the first and second packings, a lubricant supply pipe connected to said lubricant chamber intermediate the ends of the latter and a plunger reciprocable in said chamber and having a solid face at one end actuated by pressure from said piston, said plunger having a ported face at the other end and passage means therein for establishing communication between said supply pipe and said delivery duct.

FRANKLIN D. LOWTHER, Sr.

REFERENCES CITED

The following references are of record in the file of this patent:

UNITED STATES PATENTS

| Number | Name | Date |
|---|---|---|
| 491,224 | Poore | Feb. 7, 1893 |
| 1,813,846 | Goldsborough | July 7, 1931 |